United States Patent
Isaac et al.

(10) Patent No.: US 11,382,273 B2
(45) Date of Patent: Jul. 12, 2022

(54) THRESHING COMPONENTS FOR COMBINE HARVESTER

(71) Applicant: CNH Industrial America LLC, New Holland, PA (US)

(72) Inventors: Nathan E. Isaac, Lancaster, PA (US); Michael Minnich, Elizabethtown, PA (US); Curtis Hillen, Lititz, PA (US); Cale Boriack, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 339 days.

(21) Appl. No.: 16/672,784

(22) Filed: Nov. 4, 2019

(65) Prior Publication Data
US 2021/0127583 A1 May 6, 2021

(51) Int. Cl.
*A01F 7/06* (2006.01)
*A01F 12/22* (2006.01)
*A01F 12/20* (2006.01)
*A01F 7/02* (2006.01)
*A01F 12/44* (2006.01)

(52) U.S. Cl.
CPC .............. *A01F 7/067* (2013.01); *A01F 12/20* (2013.01); *A01F 12/22* (2013.01); *A01F 7/02* (2013.01); *A01F 7/06* (2013.01); *A01F 12/442* (2013.01)

(58) Field of Classification Search
CPC .......... A01F 12/20; A01F 7/067; A01F 12/22; A01F 7/02; A01F 7/06; A01F 12/442
See application file for complete search history.

(56) References Cited

U.S. PATENT DOCUMENTS

| | | | | |
|---|---|---|---|---|
| 927,331 | A * | 7/1909 | Dagel | A01F 12/22 460/122 |
| 1,853,784 | A * | 4/1932 | Stevens | A01F 12/20 460/70 |
| 2,283,402 | A * | 5/1942 | Welty | A01F 12/20 460/71 |
| 3,927,679 | A * | 12/1975 | Ausherman | A01F 12/22 460/71 |
| 4,796,645 | A * | 1/1989 | Kuchar | A01F 12/20 460/107 |

(Continued)

FOREIGN PATENT DOCUMENTS

CN 101379916 A 3/2009
EP 0340876 A1 * 11/1989 .............. A01F 7/06

(Continued)

OTHER PUBLICATIONS

Extended European Search Report for EP Application No. 20205730.3 dated Mar. 29, 2021 (six pages).

*Primary Examiner* — Arpad Fabian-Kovacs
(74) *Attorney, Agent, or Firm* — Peter Zacharias; Patrick Sheldrake

(57) ABSTRACT

A threshing system for a combine harvester includes a support bracket that is configured to be attached to a threshing rotor cylinder of the threshing system and a rasp bar that is configured to be mounted to the support bracket. A channel is formed in one of the rasp bar and the support bracket for receiving a surface of the other of the rasp bar and the support bracket, wherein engagement between the channel and the surface limits movement of the rasp bar on the support bracket.

20 Claims, 17 Drawing Sheets

(56) References Cited

U.S. PATENT DOCUMENTS

| | | | |
|---|---|---|---|
| 4,889,517 A * | 12/1989 | Strong | A01F 7/06 460/66 |
| 4,972,665 A | 11/1990 | Hicks | |
| 5,035,675 A * | 7/1991 | Dunn | A01F 12/22 460/62 |
| 5,152,717 A * | 10/1992 | Nelson | A01F 12/442 460/110 |
| 5,192,246 A * | 3/1993 | Francis | A01F 7/06 460/110 |
| 5,254,036 A | 10/1993 | Johnson et al. | |
| 5,624,314 A * | 4/1997 | Welch | A01F 12/20 460/72 |
| 6,261,176 B1 * | 7/2001 | Welch | A01F 12/20 460/110 |
| 6,325,714 B1 * | 12/2001 | Tanis | A01F 12/22 460/71 |
| 6,503,143 B2 | 1/2003 | Gerber et al. | |
| 6,729,952 B2 | 5/2004 | Voss et al. | |
| 7,771,261 B2 * | 8/2010 | Schlesser | A01F 12/40 460/71 |
| 8,313,360 B2 | 11/2012 | Murray et al. | |
| 8,529,325 B2 * | 9/2013 | Kile | A01F 12/20 460/71 |
| 8,636,569 B1 * | 1/2014 | Flickinger | A01F 12/22 460/71 |
| 9,198,358 B2 * | 12/2015 | Hollatz | A01F 12/22 |
| 10,342,177 B2 * | 7/2019 | Bojsen | A01F 7/06 |
| 2008/0167100 A1 | 7/2008 | Farley et al. | |
| 2011/0207511 A1 * | 8/2011 | Schwersmann | A01F 12/22 460/81 |
| 2017/0339834 A1 | 11/2017 | Bojsen | |

FOREIGN PATENT DOCUMENTS

| | | | | |
|---|---|---|---|---|
| EP | 1559307 A1 * | 8/2005 | | A01F 12/20 |
| EP | 2238824 A1 * | 10/2010 | | A01F 12/20 |
| EP | 3031316 A1 * | 6/2016 | | A01F 7/067 |
| EP | 3818811 A1 * | 5/2021 | | A01F 12/20 |
| WO | WO-0111941 A1 * | 2/2001 | | A01F 7/06 |
| WO | WO-0124608 A1 * | 4/2001 | | A01F 12/22 |
| WO | WO-2012110090 A1 * | 8/2012 | | A01F 12/20 |
| WO | 2018039751 A2 | 3/2018 | | |

* cited by examiner

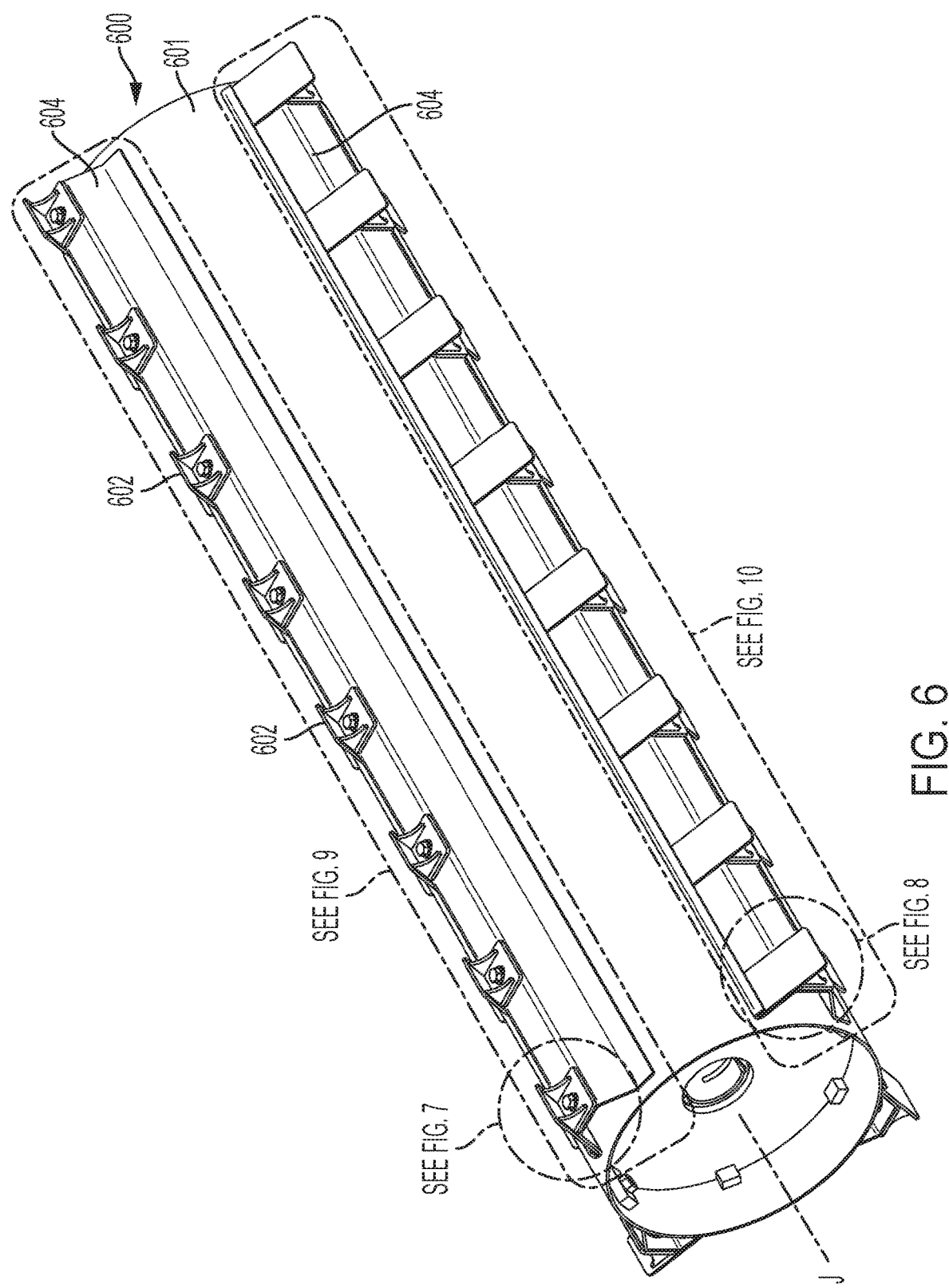

US 11,382,273 B2

THRESHING COMPONENTS FOR COMBINE HARVESTER

FIELD OF THE INVENTION

The present invention relates generally to a paddle (or rasp bar) for a threshing drum (or rotor) of a combine harvester.

BACKGROUND OF THE INVENTION

As is described in U.S. Pat. No. 8,313,360 to CNH America LLC, which is incorporated by reference herein in its entirety and for all purposes, many agricultural combines use a rotary threshing and/or separating system. The system typically includes at least one rotor drivingly rotated within a rotor housing or cage including a perforated concave spaced radially outwardly thereof. The rotor will often have a frusto-conical inlet end having a helical flight or flights there around for conveying a flow of crop material into a space between the rotor and the rotor cage. The main body of the rotor will typically have an array or layout of threshing elements, typically rasp bars or paddles, which protrude radially outwardly into the space for conveying a mat of the crop material along a helical path through the space. Rasp bars cooperate with the rotor housing to separate larger components of the crop, namely crop residue commonly referred to as straw, which includes stalks, stems, cobs and the like, from the smaller grain and material other than grain.

Rasp bars are typically mounted to a support bracket on the rotor by a bolt. The support bracket may be welded (or otherwise non-removably and permanently mounted) to the outer surface of the rotor. Worn rasp bars may be replaced by removing the bolt and attaching a new rasp bar to the support bracket. Rasp bars are replaced in order to improve threshing efficiency and to avoid a rasp bar failure, which may significantly damage the combine.

Conventional rasp bars can be difficult to replace because the retaining hardware (e.g., bolt) is disposed on the rear surface of the rasp bar and the rear surface can be difficult to access with a tool. Also, conventional rasp bars can be easily damaged when impacted by crop load and foreign objects (i.e., rocks), have high rates of material wear and may be characterized as requiring frequent replacement. Accordingly, there is a need for an improved rasp bar that at least partially addresses the problems identified above.

SUMMARY OF THE INVENTION

According to one aspect of the invention, a threshing system for a combine harvester includes a support bracket that is configured to be attached to a threshing rotor cylinder of the threshing system and a rasp bar that is configured to be mounted to the support bracket. A channel is formed in one of the rasp bar and the support bracket for receiving a surface of the other of the rasp bar and the support bracket, wherein engagement between the channel and the surface limits movement of the rasp bar on the support bracket.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 6 shows a second embodiment of a threshing rotor (auger flight omitted) that may be used with the combine of FIG. 1.

DETAILED DESCRIPTION OF THE INVENTION

Figure 1:
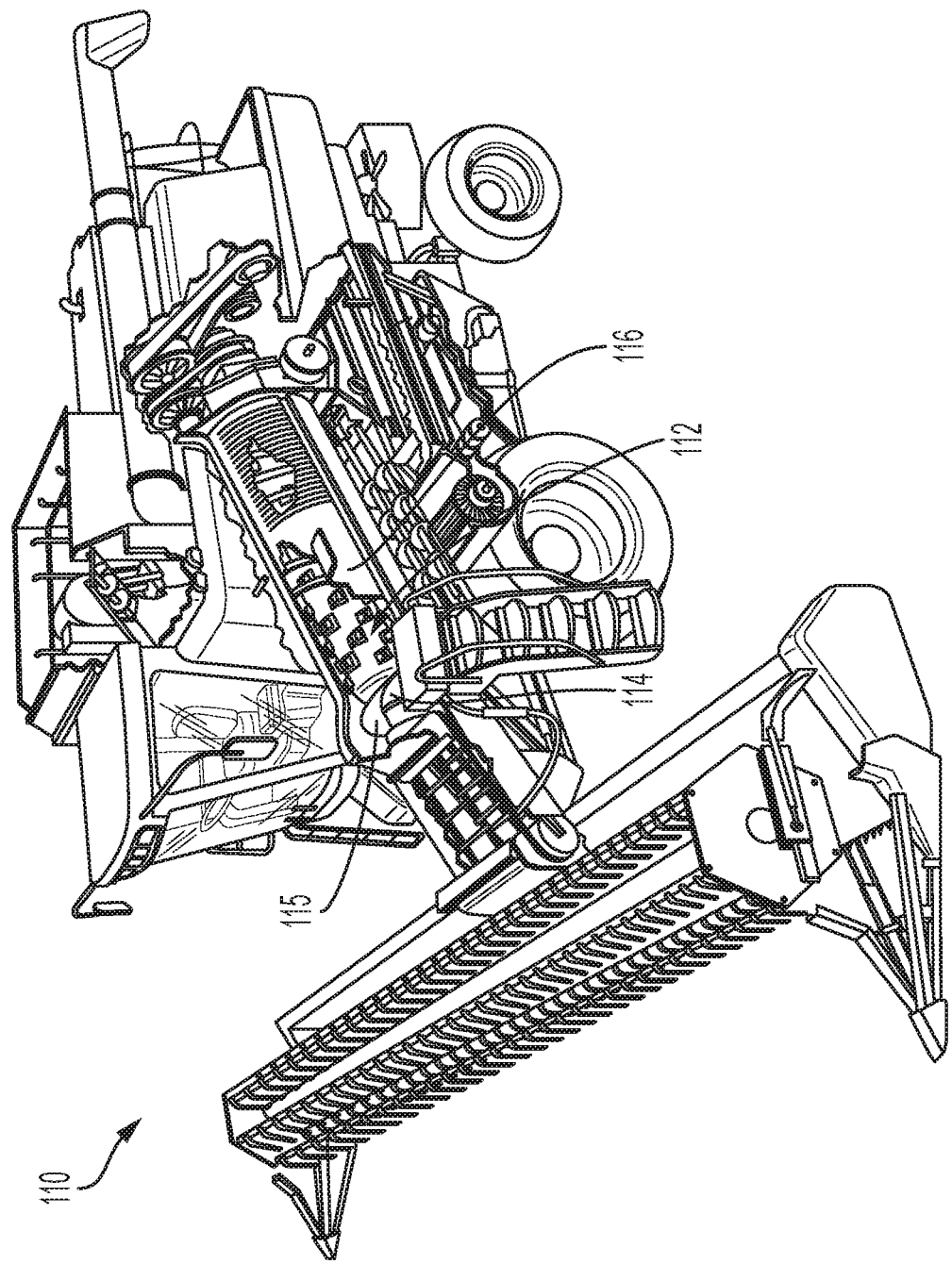
FIG. 1 shows a conventional agricultural combine having a rotary threshing system.
Figure 2:
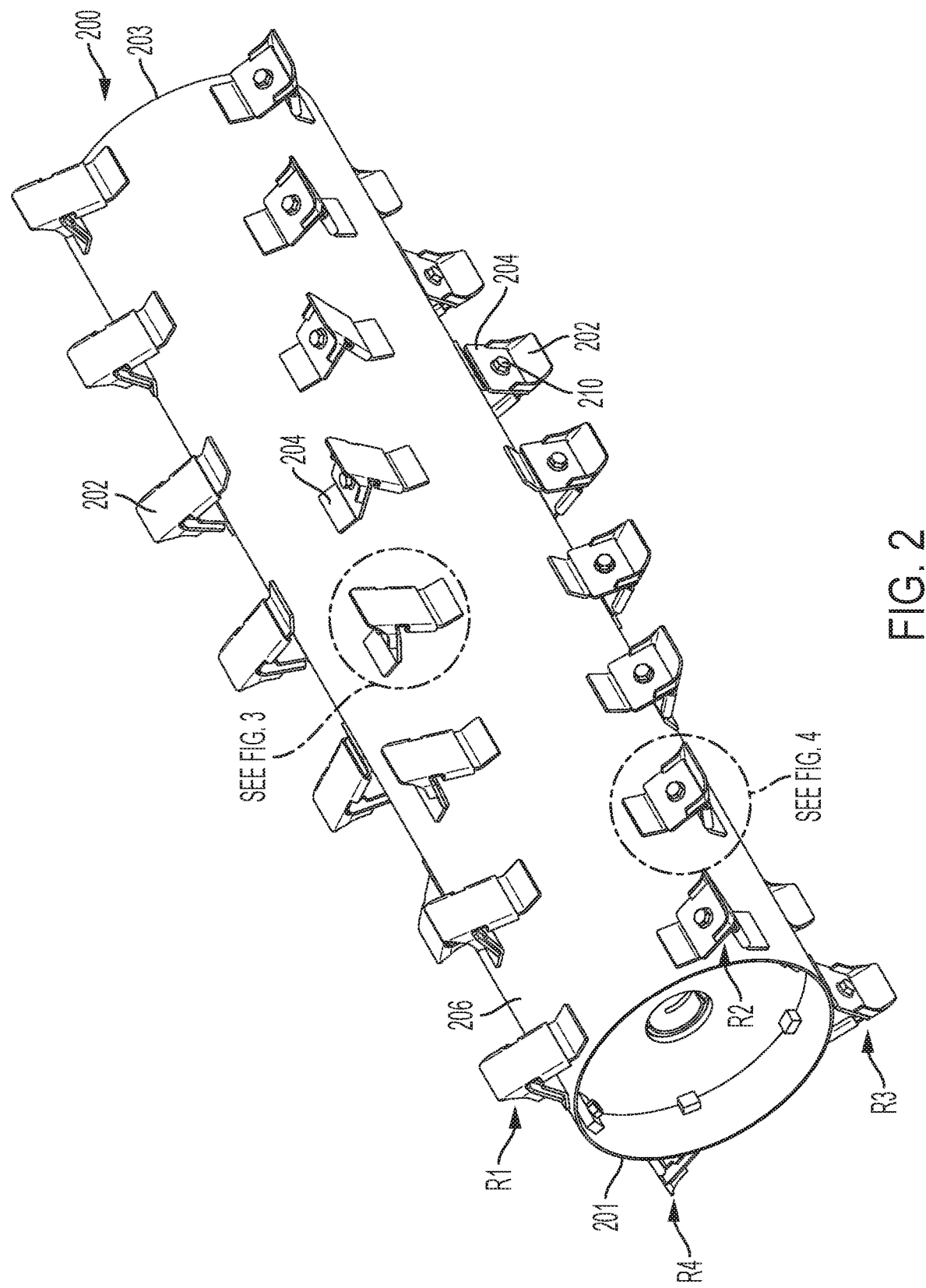
FIG. 2 shows a first embodiment of a threshing rotor (auger flight omitted) that may be used with the combine of FIG. 1.

Corresponding reference characters indicate corresponding parts throughout the several views. The exemplification set out herein illustrates embodiments of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting.

Referring now to the drawings, as is described in U.S. Pat. No. 8,313,360, FIG. 1 depicts an embodiment of an agricultural combine 110 according to the invention. The agricultural combine 110 includes a rotary threshing system 112 having a threshing rotor 114 in a rotor cage 116. An auger flight 115 is positioned at the forward end of the threshing rotor 114. Agricultural combine 110 is representative of an axial flow-type combine including one or two fore and aft extending threshing rotors, but it should be understood that it is contemplated that the invention can likewise be used with rotors of other types of combines, including, but not limited to, conventional types wherein one or more rotors of the invention will be mounted in a transverse orientation within a body of the combine.

Referring now to the first embodiment shown in FIGS. 2-5A, FIG. 2 shows a first embodiment of a threshing rotor 200 (auger flight omitted) that is configured for use with the combine 110. The threshing rotor 200 is similar to the threshing rotor 114 of FIG. 1, and only the primary differences therebetween will be described hereinafter. The rasp bars 202 are arranged in multiple rows (R1 through R4) that are evenly spaced apart about the perimeter of the rotor cylinder 206. Each row R1-R4 follows a helical path from the leading end 201 to the trailing end 203 of the rotor. Alternatively, the rasp bars 202 may arranged differently.

Figure 3:
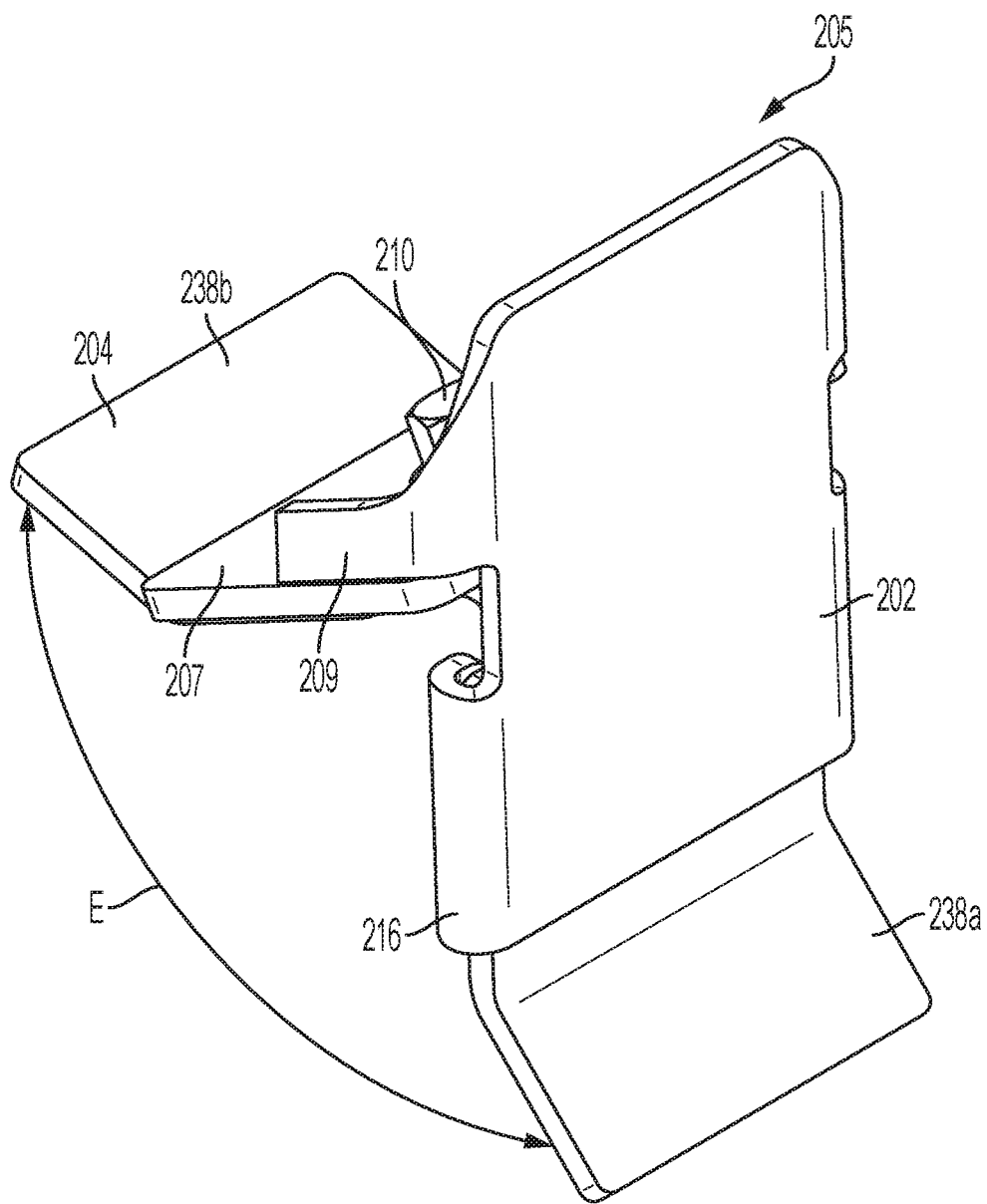
FIGS. 3 and 4 depict isometric views of a sub-assembly of the rasp bar and support bracket of the threshing rotor of FIG. 2.
Figure 4:
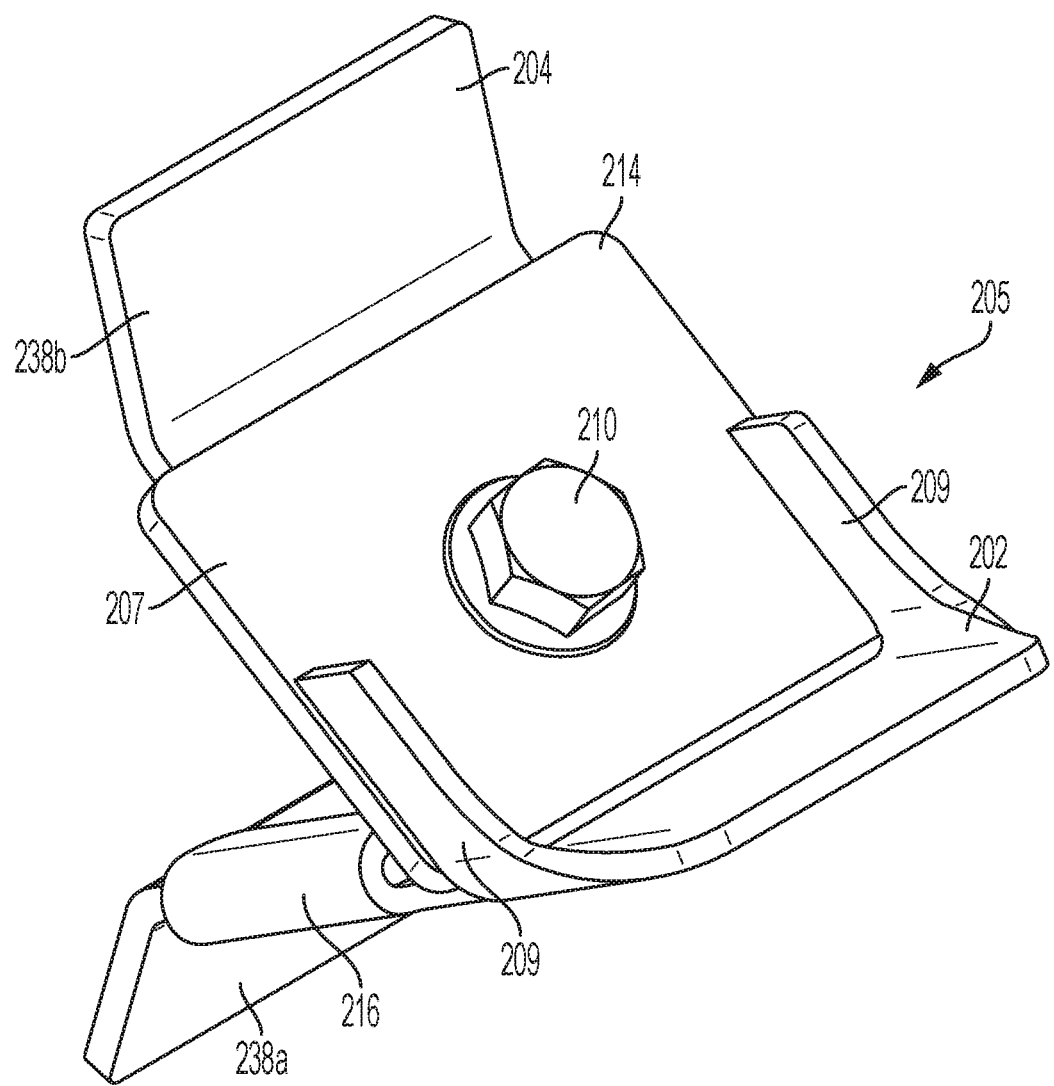
Figure 4A:
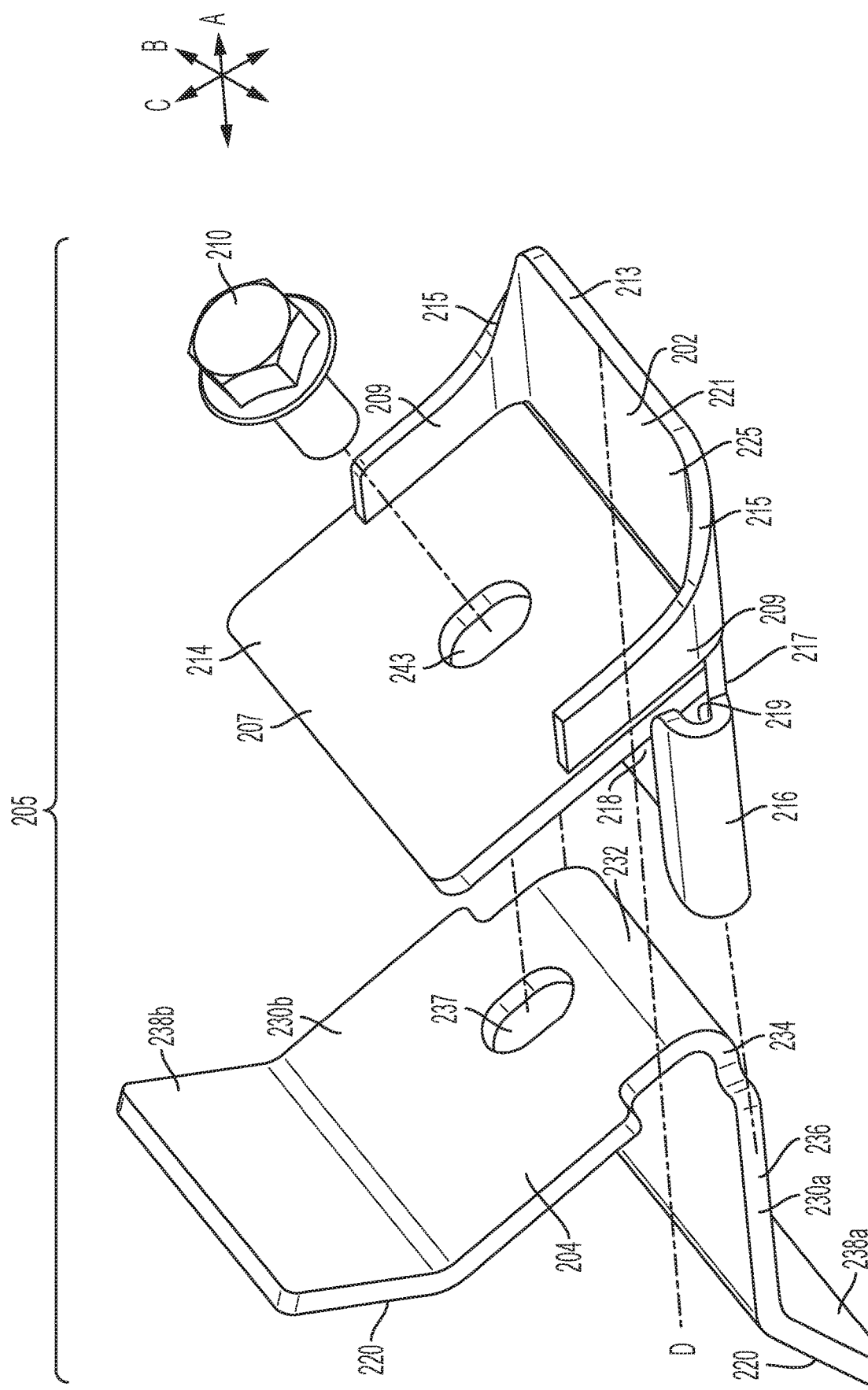
FIG. 4A depicts an exploded view of the sub-assembly of FIGS. 3 and 4.

FIGS. 3, 4 and 4A depict isometric views of a sub-assembly 205 of the threshing rotor comprising a rasp bar 202, a blocking plate 207 and support bracket 204. Each rasp bar 202 is removably mounted to a respective support bracket 204. The support bracket 204 is mounted to the rotor cylinder 206 by a weld, for example. The connection between each support bracket 204 and the rotor cylinder 206 may (or may not) be permanent. The blocking plate 207 is disposed between arm portions 209 extending from the body of the rasp bar 202 and the support bracket 204. The plate 207 may be integrally formed with the rasp bar 202 by way of a molding or casting operation, for example. Alternatively, the blocking plate 207 may be fixedly connected to the rasp bar 202 by a weld, adhesive or fastener, for example.

Referring now to the individual components of the sub-assembly 205, the rasp bar 202 is a sheetmetal body including a flat rectangular portion 221 from which other features of the rasp bar 202 depend. As best shown in FIG. 4A, the portion 221 extends longitudinally along axis A and transversely along the axis B. Two arms 209 extend forwardly along lateral axis C from the longitudinal sides 217 of the portion 221 at a location adjacent the top edge 213 of the rasp bar 202. An internal angle G (FIG. 4A) is defined between the arms 209 and a plane defined by the forward facing surface 225 of the portion 221. The angle G may be 90 degrees for example. Each arm 209 is substantially rectangular in shape. The top corners 215 of the portion 221 are rounded as each corner transitions from the top edge 213 to the arms 209. The arms 209 are spaced apart along the longitudinal axis A (see FIG. 4A) from the top edge 213 by a predetermined distance. The arms 209 extend over the top surface 214 of the plate 207.

Two curved legs 216 extend forwardly along lateral axis C from the opposing longitudinal sides 217 of the portion 221. The legs 216 and arms 209 extend in the same direction. The legs 216 are positioned at the bottom end 218 of the portion 221 at an elevation beneath the arms 209 as viewed along the long axis D. The lower edge of the legs 216 forms at least a portion of the bottom end 218. The curved legs 216 curve inwardly toward the long axis D of the sub-assembly 205 to face one another. For each leg 216, a channel 219 is defined between the forward facing surface 225 of the portion 221 and the interior surface of the leg 216.

The support bracket 204 is a V-shaped metallic body having two legs 230a and 230b (referred to collectively as legs 230). An internal angle defined between the legs 230 may be 90 degrees, for example. The internal angle compliments the angle G of the rasp bar 202. The legs 230 intersect at a curved portion 232. A recess or cutout 234 is formed on each transverse side of the curved portion 232. The cutouts 234 provide a relief for insertion of the legs 216 over the side edges 236 of the leg 230a.

Figure 5:
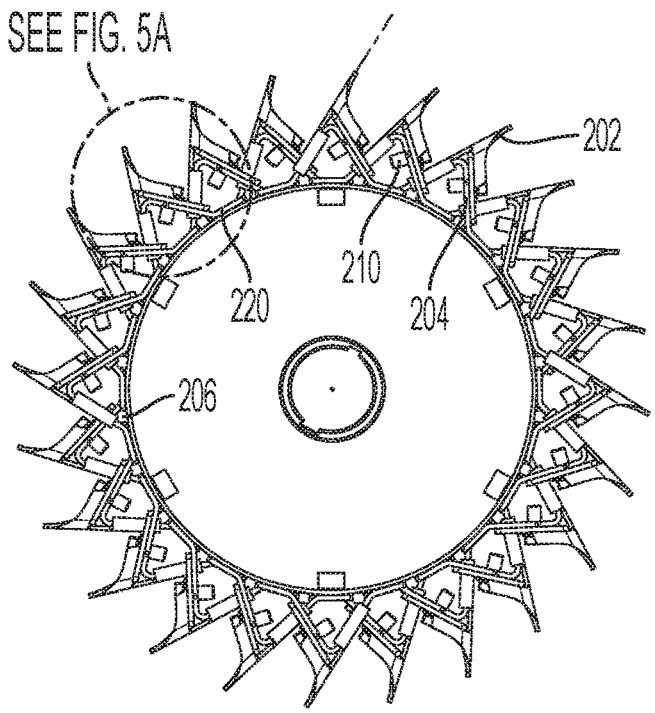
FIG. 5 is a side elevation view of the rotor of FIG. 2.
Figure 5A:
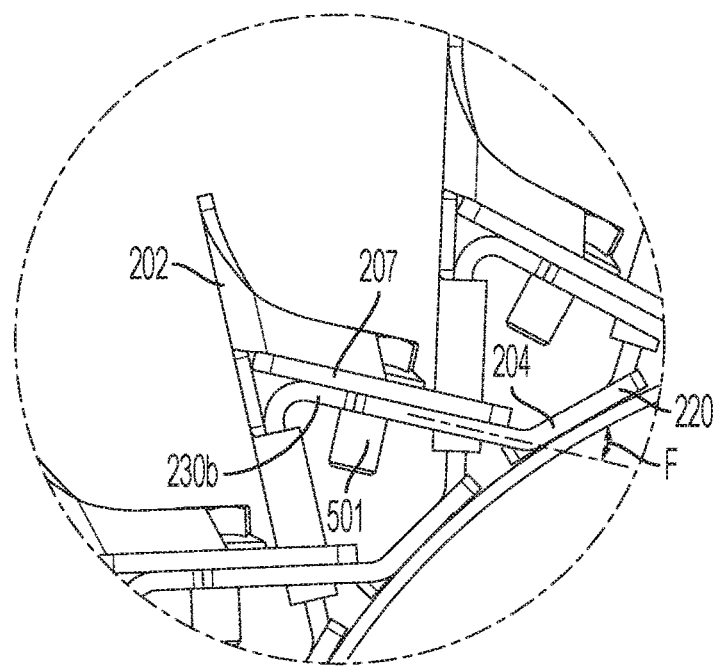
FIG. 5A is a detailed view of FIG. 5.

An elongated opening 237 is formed in the leg 230b for receiving the fastener 210. The opening 237 could be threaded, if so desired, in lieu of using threaded nut 501 (FIG. 5A). The threaded nut 501 may be welded to the rear side of the opening 237. Mounting tabs 238a and 238b extend laterally from the legs 230a and 230b, respectively. The tabs 238a and 238b are referred to collectively as tabs 238. The mounting tabs 238 extend from the V-shaped body in opposite directions. The lower side of each mounting tab 238 defines a rectangular shaped mounting surface 220 that is configured to be welded or otherwise connected to the exterior surface of the rotor cylinder 206.

As best shown in FIG. 5A, each leg 230 extends from the tab 238, from which the leg depends, by an angle F, which may be 15 to 75 degrees, for example. An obtuse angle E (FIG. 3) is formed between the mounting surfaces 220 of the tabs 238. The angle E may be 130 to 160 degrees, for example, to compliment the exterior rounded surface of the rotor cylinder 206.

The blocking plate 207 is a rectangular member having rounded corners. An elongated opening 243 is provided in the approximate center of the plate 207 for receiving the fastener 210.

The support bracket 204, rasp bar 202 and plate 207 may be composed of mild steel, grade 50 steel or cast steel, for example. Those components may be composed of sheet-metal, or they may be cast.

Referring now to the process of assembling the rasp bar 202 onto the support bracket 204, it is first assumed that the support bracket 204 is already welded to the rotor cylinder 206. The legs 216 of the rasp bar 202 are first slid downward along axis A and inserted through the cutouts 234 and over the sides 236 of the bracket 204 until the bottom edge 218 of the rasp bar contacts the tab 238 depending from the leg 230a. At this point, the sides 236 reside within the channels 219 of the rasp bar 202 and the underside of the plate 207 is positioned against (or adjacent) the outwardly facing surface of the leg 230b of the bracket 204. The opening 243 of the plate 207 registers with the opening 237 of the bracket 204.

The fastener 210 is then positioned through the openings 237 and 243, and connected to a threaded opening (not shown) that is provided on a nut 501 (FIG. 5A) or threads (not shown) on the opening 237. Once the fastener 210 is installed, the rasp bar 202 cannot be slid along axis A due to the fact that plate 207, which is fixed to the rasp bar 202, is bolted to the bracket 204. Also, the rasp bar 202 cannot be slid along axes B and C due to the coupling between the legs 216 and the sides 236 of the bracket 204. Only a single fastener 210 is required to mount the rasp bar 202 to the bracket 204 in view of the constraining coupling between the legs 216 and the sides 236 of the bracket 204. Cooperation between the legs 216 and the sides 236 of the bracket 204 guides installation of the rasp bar 202 onto the bracket 204 and also aids in retention of the rasp bar 202 on the bracket 204.

The above process is repeated until all of the rasp bars 202 are installed onto the rotor 200. To disassemble each rasp bar 202 from the rotor 200, the fastener 210 is first removed, and, the rasp bar 202 is slid upwardly along axis A until the legs 216 are detached from the sides 236 of the bracket 204.

Referring now to the second embodiment shown in FIGS. 6-11, FIG. 6 shows a second embodiment of a threshing rotor 600 (auger flight omitted) that may be used with the combine of FIG. 1. The rotor 600 is similar to the rotor 200 of FIG. 2 and only the primary differences therebetween will be described hereinafter.

In the threshing rotor 600, the rasp bars 602 are oriented in a straight line row across the length of the rotor cylinder 601. Four rows of rasp bars 602 are equally spaced apart about the circumference of the cylinder 601. For each row of rasp bars 602, the rasp bars 602 are mounted to a single support bracket 604.

Figure 7:
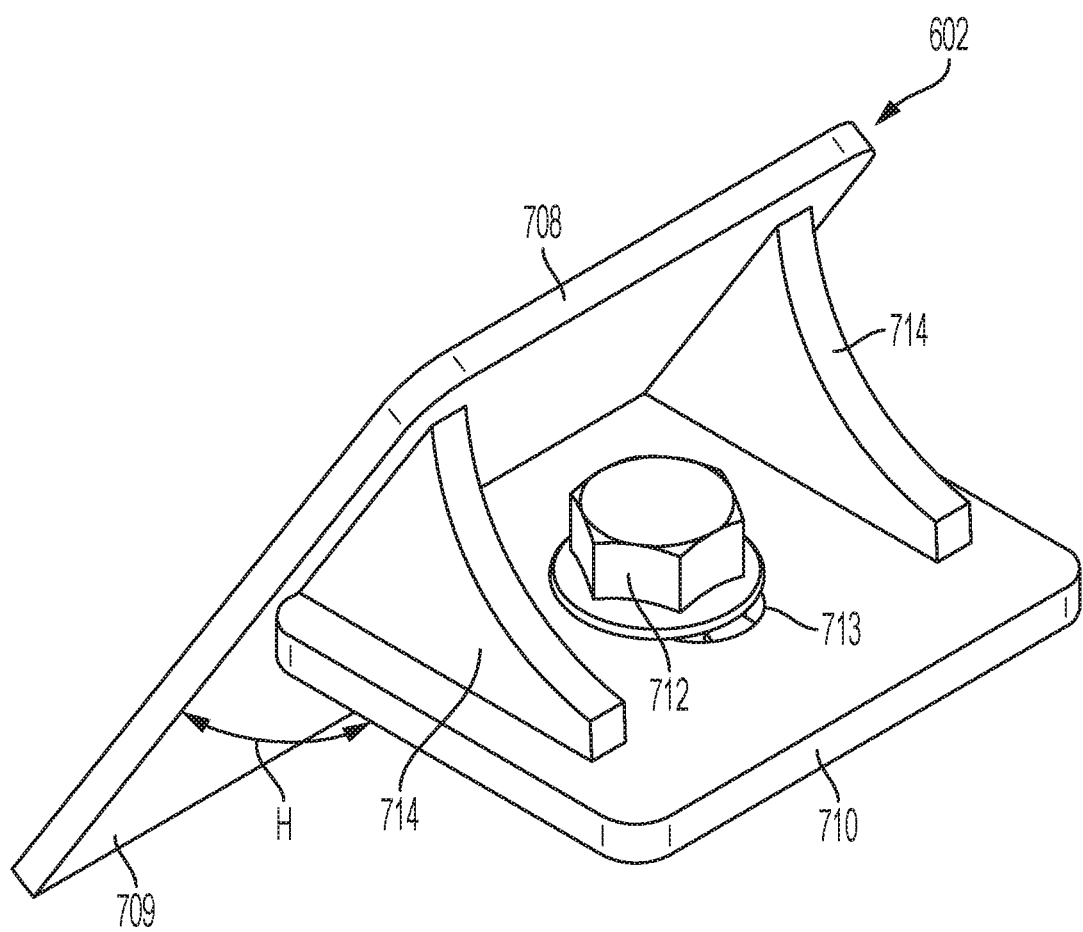
FIGS. 7 and 8 depict isometric views of the rasp bar of FIG. 6.
Figure 8:
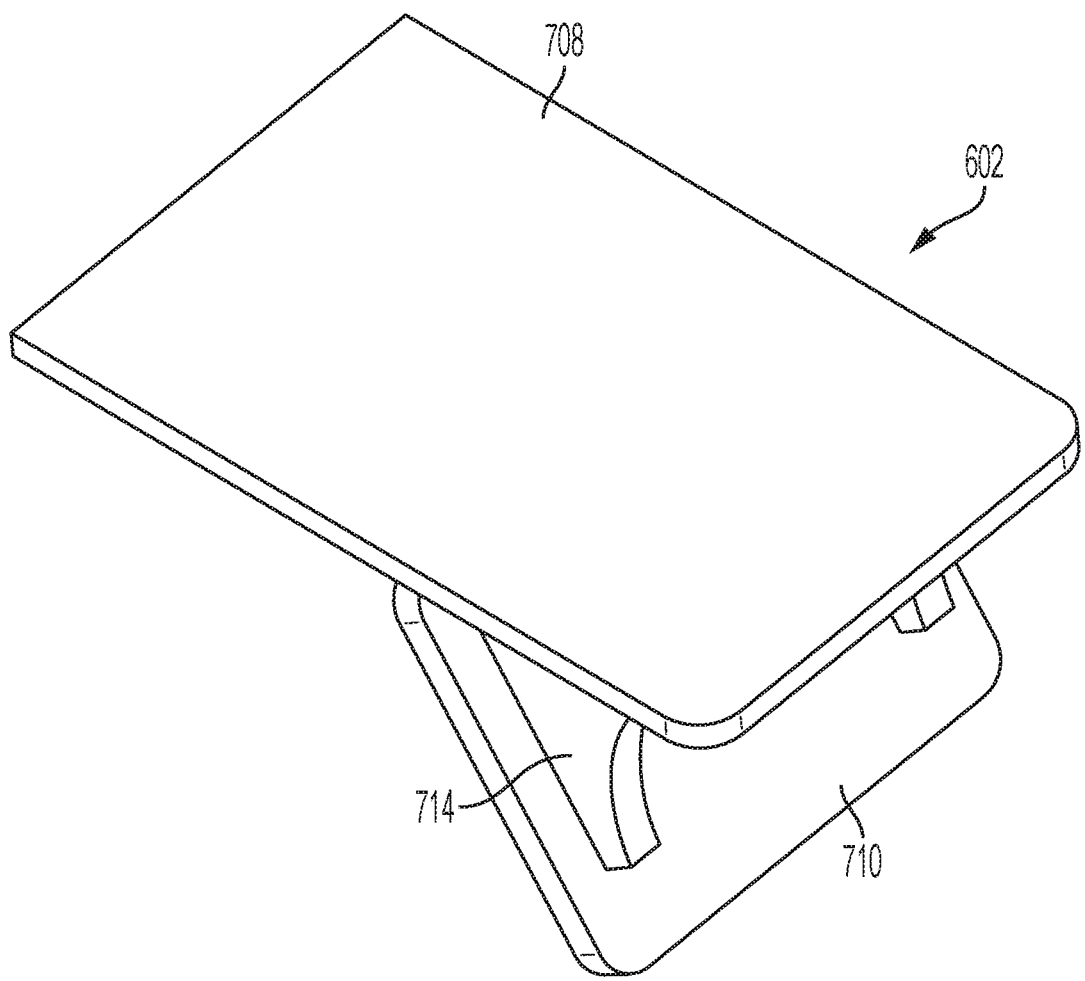

FIGS. 7 and 8 depict isometric views of the rasp bar 602 of FIG. 6. The rasp bar 602 comprises a rectangular plate 708. A mounting plate 710 is mounted to the rear side of the plate 708. An internal angle H is defined between the plates 708 and 710. Angle H may be 100 to 160 degrees, for example. The plates 708 and 710 may be welded together, for example. The mounting plate 610 includes an elongated opening 713 through which a fastener 712 can be positioned (as shown). Gussets 714 are disposed between the rear side of the plate 708 and the top side of the plate 710 to strengthen the joint between the plates 710 and 708. The rasp bar 602 may be a unitary component or it may be formed from separate components that are mounted together.

Figure 9:
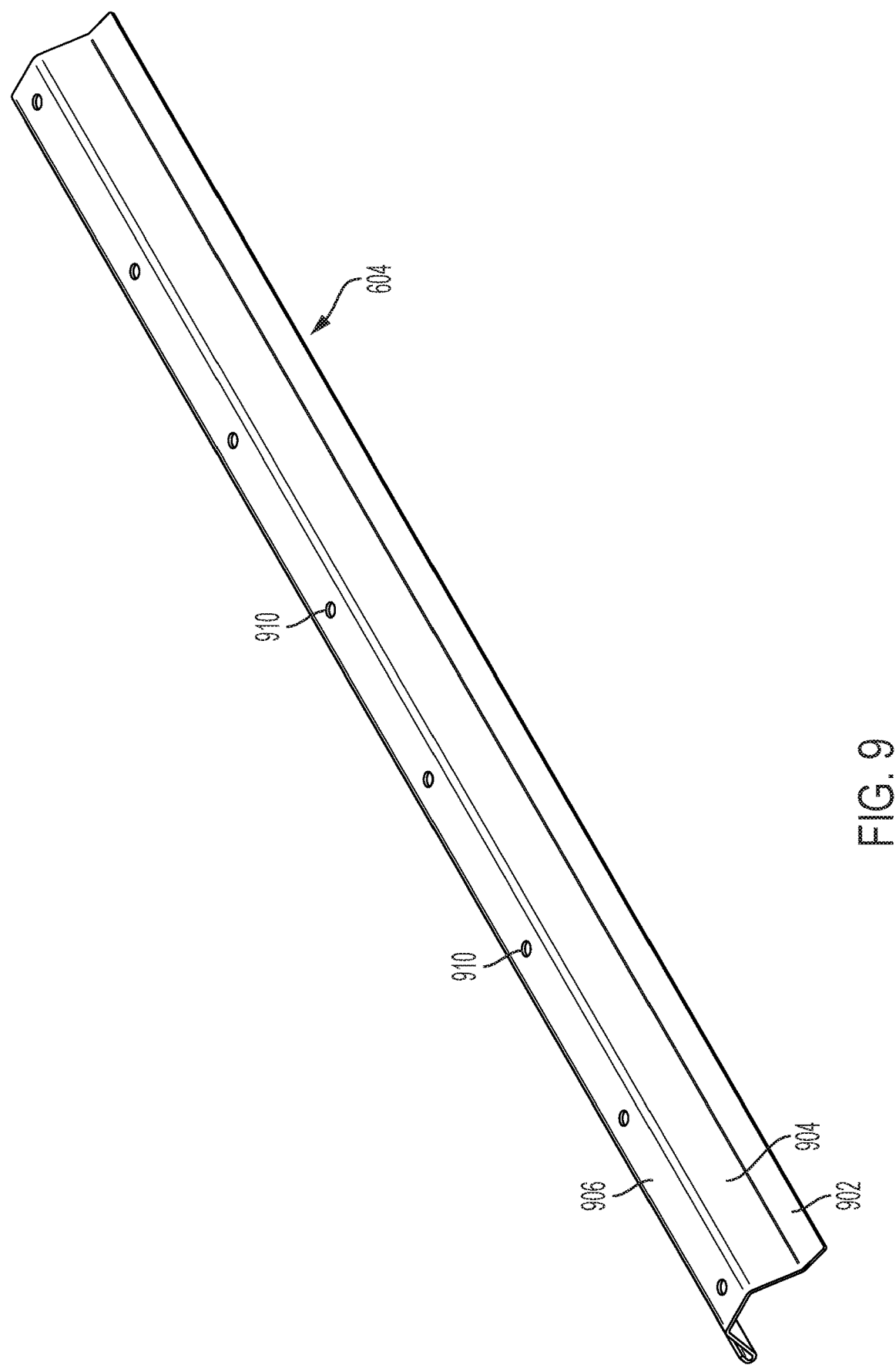
FIGS. 9 and 10 depict isometric views of the support bracket of FIG. 6.
Figure 10:
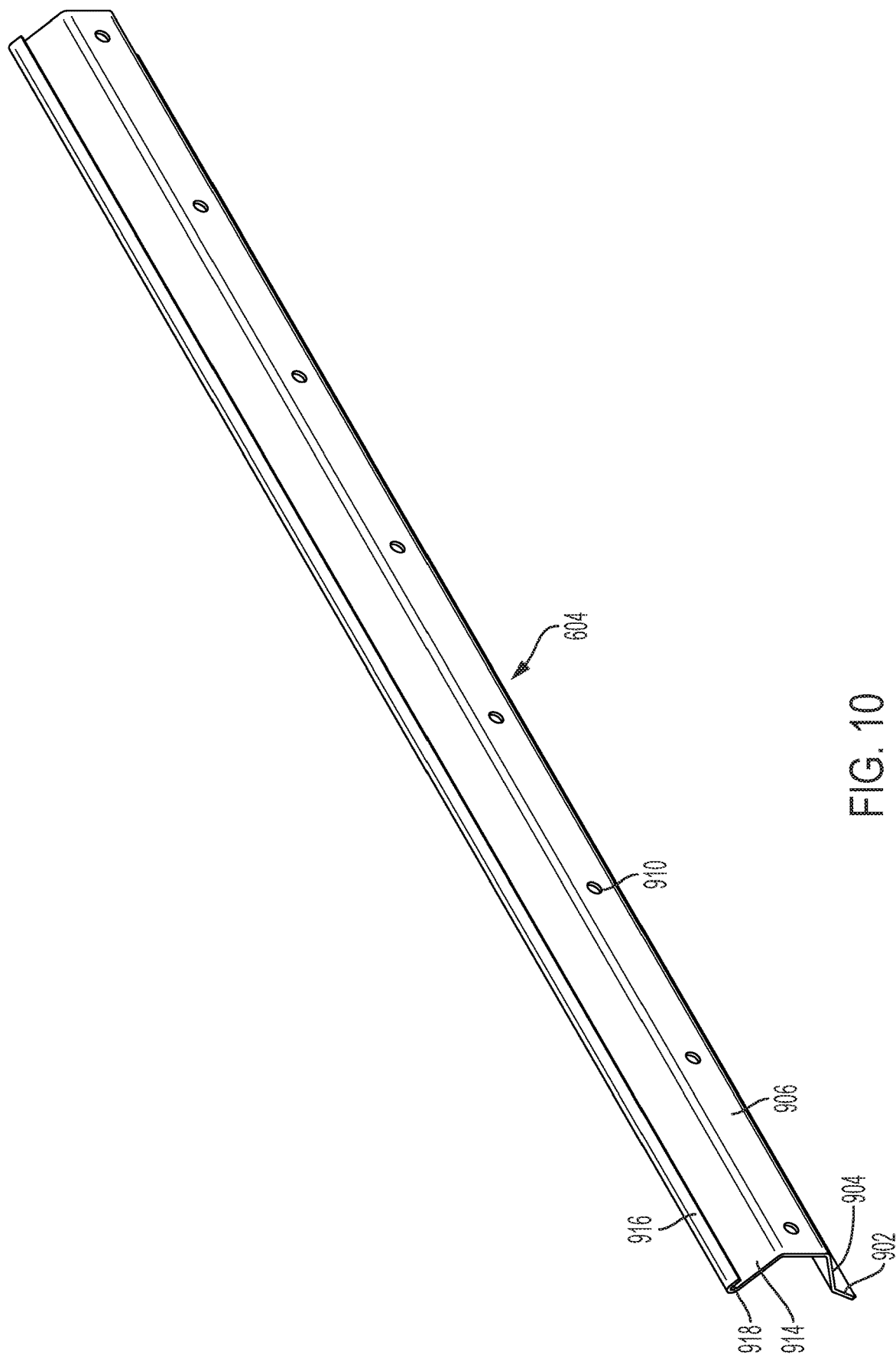
Figure 11:
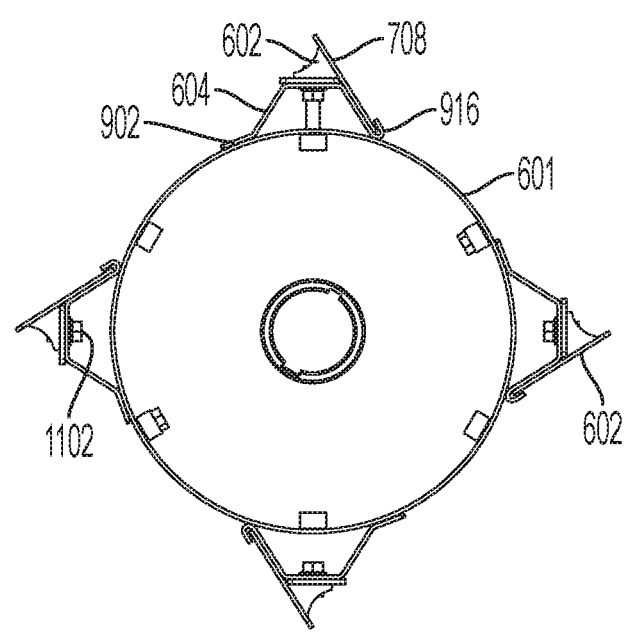
FIG. 11 is a side elevation view of the rotor of FIG. 6.

FIGS. 9 and 10 depict isometric views of the support bracket 604 of FIG. 6. The support bracket 604 is similar to the support bracket 204 with the primary exception that the support bracket 604 is one continuous straight bracket that can accommodate a plurality of rasp bars 602. The bracket 604 includes a first elongated planar surface 902 that is configured to be welded (or otherwise mounted) to the outer surface of the cylinder 601. An elongated surface 904 extends upwardly from the surface 902 at an obtuse angle. A planar mounting surface 906 extends transversely from and depends from the surface 904. In an assembled form, the plate 710 of the rasp bar 602 is configured to be mounted to the surface 906. A series of openings 910 are disposed on the mounting surface 906. Nuts 1102 (FIG. 11), such as weld nuts or cinch nuts, may be welded (or otherwise mounted) to the underside of the openings 910 for receiving a fastener 712. Another elongated surface 914 extends downwardly from the surface 910 at an obtuse angle. The surfaces 914, 906 and 904 together form a U shape or bowl shape. The terminal end 916 of the surface 914 is folded over upon itself such that a space or channel 918 is defined between the folded edge 916 and the surface 914. The channel 918 is sized to receive the free end 709 (FIG. 7) of the rasp bar 602. The terminal end 916 may be welded (or otherwise mounted) to the outer surface of the cylinder 601.

Referring now to the process of assembling the rasp bar 602 onto the support bracket 604, it is first assumed that the support brackets 604 are already welded to the rotor cylinder 601. The plate 708 of the rasp bar 602 is first slid downward on the surface 914 of the bracket 604 until the bottom edge 709 of the rasp bar 602 is positioned within the channel 918. At this time, the plate 710 is also positioned on the surface 906 of the bracket 604. The fastener 712 is then positioned through the openings 713 and 910, and connected to a threaded opening (not shown) that is provided on a nut 1102 (FIG. 11) or threads (not shown) on the opening 910. Once the fastener 712 is installed, the rasp bar 602 cannot be slid along axis J (FIG. 6) or moved in any other direction due to the fact that rasp bar 602 is bolted to the bracket 604, and the edge 709 of the rasp bar 602 is constrained within the channel 918. Cooperation between the edge 709 of the rasp bar 602 and the channel 918 guides installation of the rasp bar 602 onto the bracket 604 and also aids in retention (e.g., prevents rotation) of the rasp bar 602 on the bracket 604.

Referring now to the third embodiment shown in FIGS. 12-16, FIG. 12 shows a third embodiment of a threshing rotor 1200 (auger flight omitted) that may be used with the combine 110 of FIG. 1. The rotor 1200 is similar to the rotor 600 of FIG. 6 and only the primary differences therebetween will be described hereinafter. Like the rotor 600, for each row of rasp bars 1202, the rasp bars 1202 are mounted to a single support bracket 1204.

Figure 12:
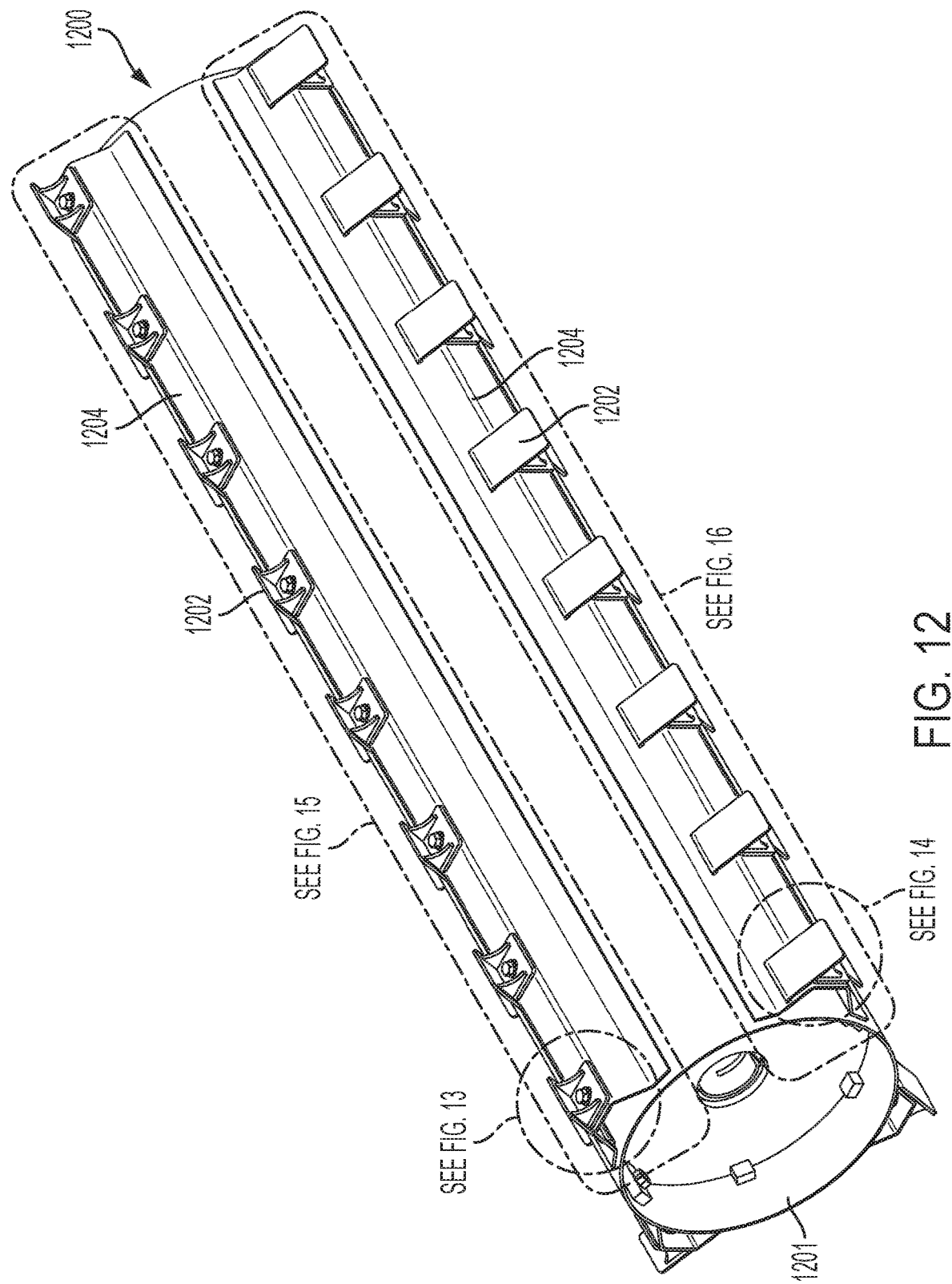
FIG. 12 shows a third embodiment of a threshing rotor (auger flight omitted) that may be used with the combine of FIG. 1.
Figure 13:
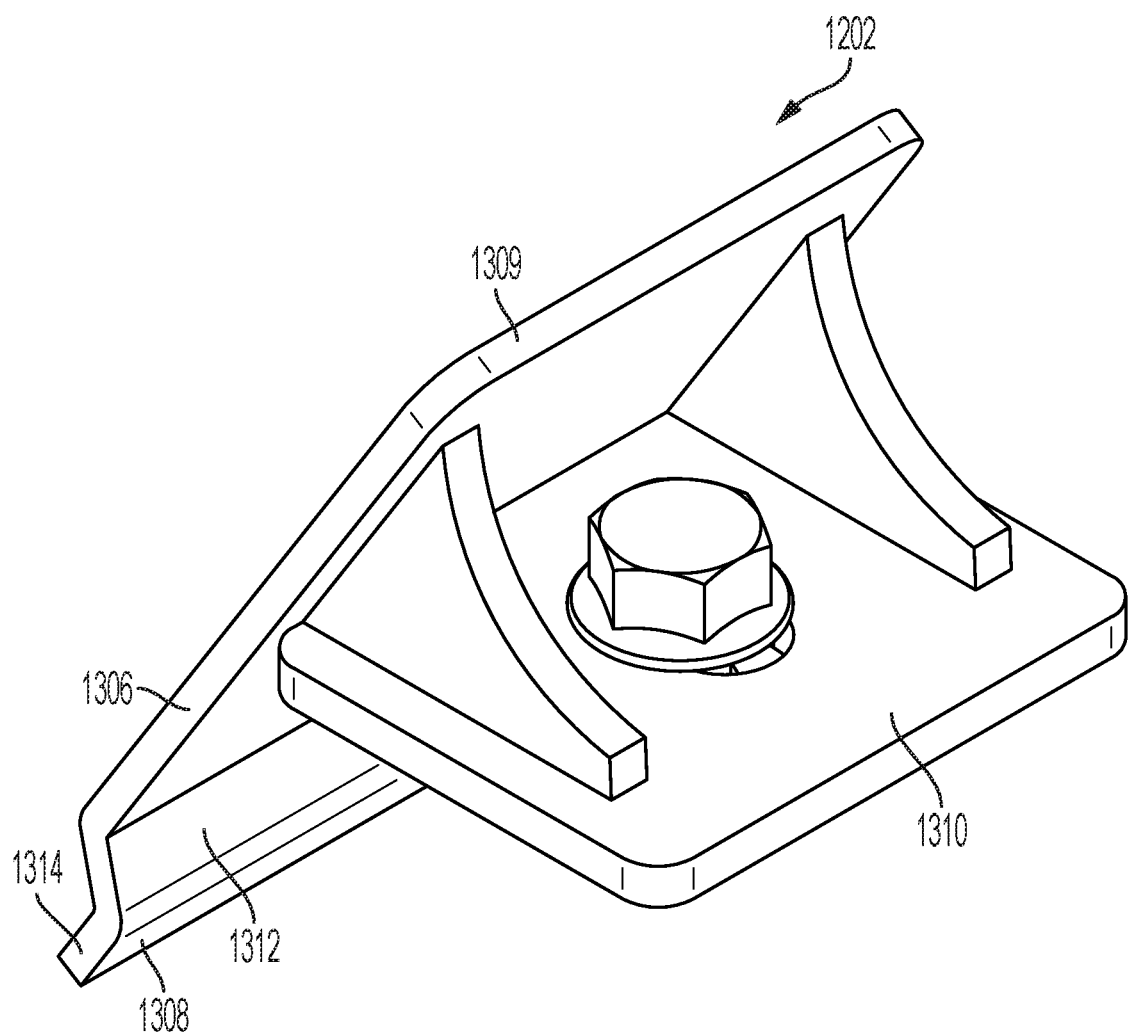
FIGS. 13 and 14 depict isometric views of the rasp bar of FIG. 12.
Figure 14:
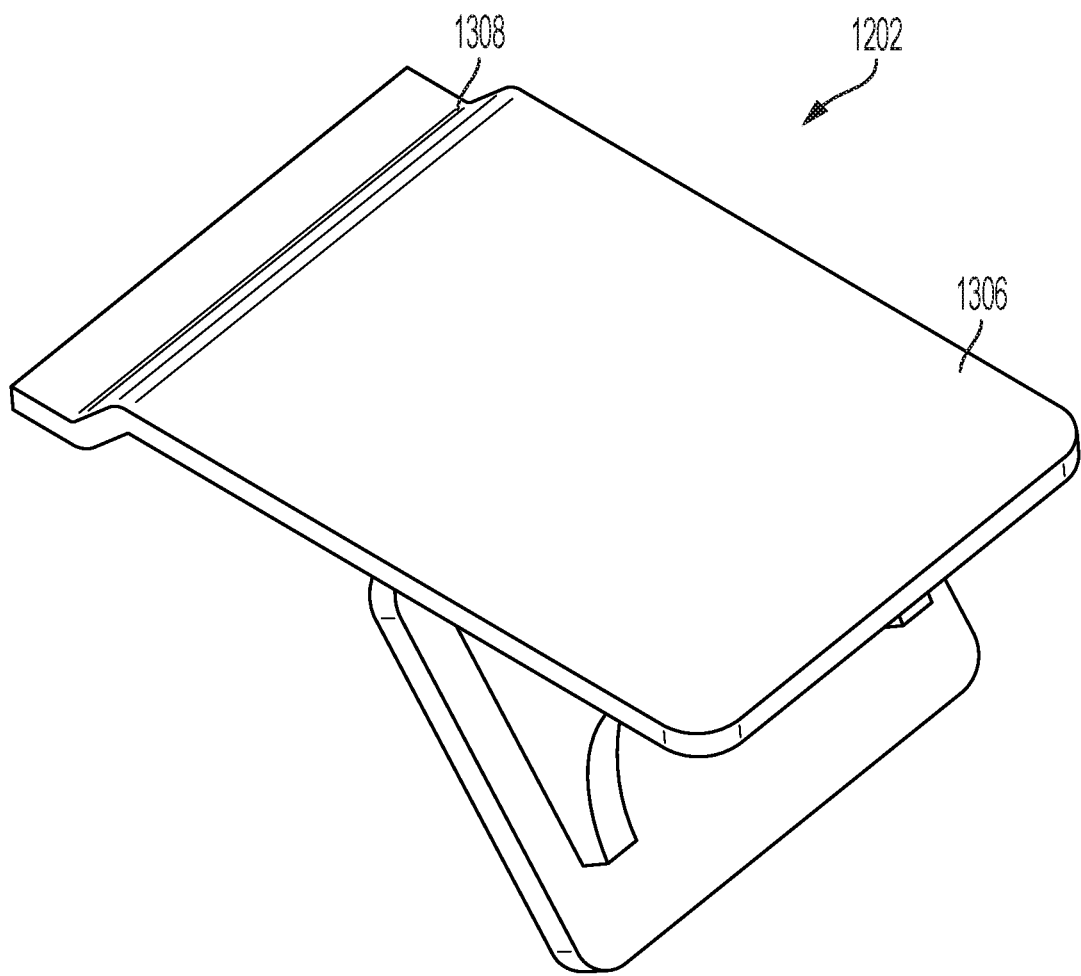

FIGS. 13 and 14 depict isometric views of the rasp bar 1202 of FIG. 12. The rasp bar 1202 differs from the rasp bar 602 in that the free end of the plate 1306 has a bent section 1308 that is bent inwardly toward the plate 1310. The bend has a J-shape. The bent section 1308 has an angled portion 1312 that extends and depends from the flat surface 1309 of the plate 1306, and a planar portion 1314 at the terminal edge of the plate 1306 that extends and depends from the angled portion 1312. The surfaces/portions 1314 and 1309 are oriented parallel to each other.

Figure 15:
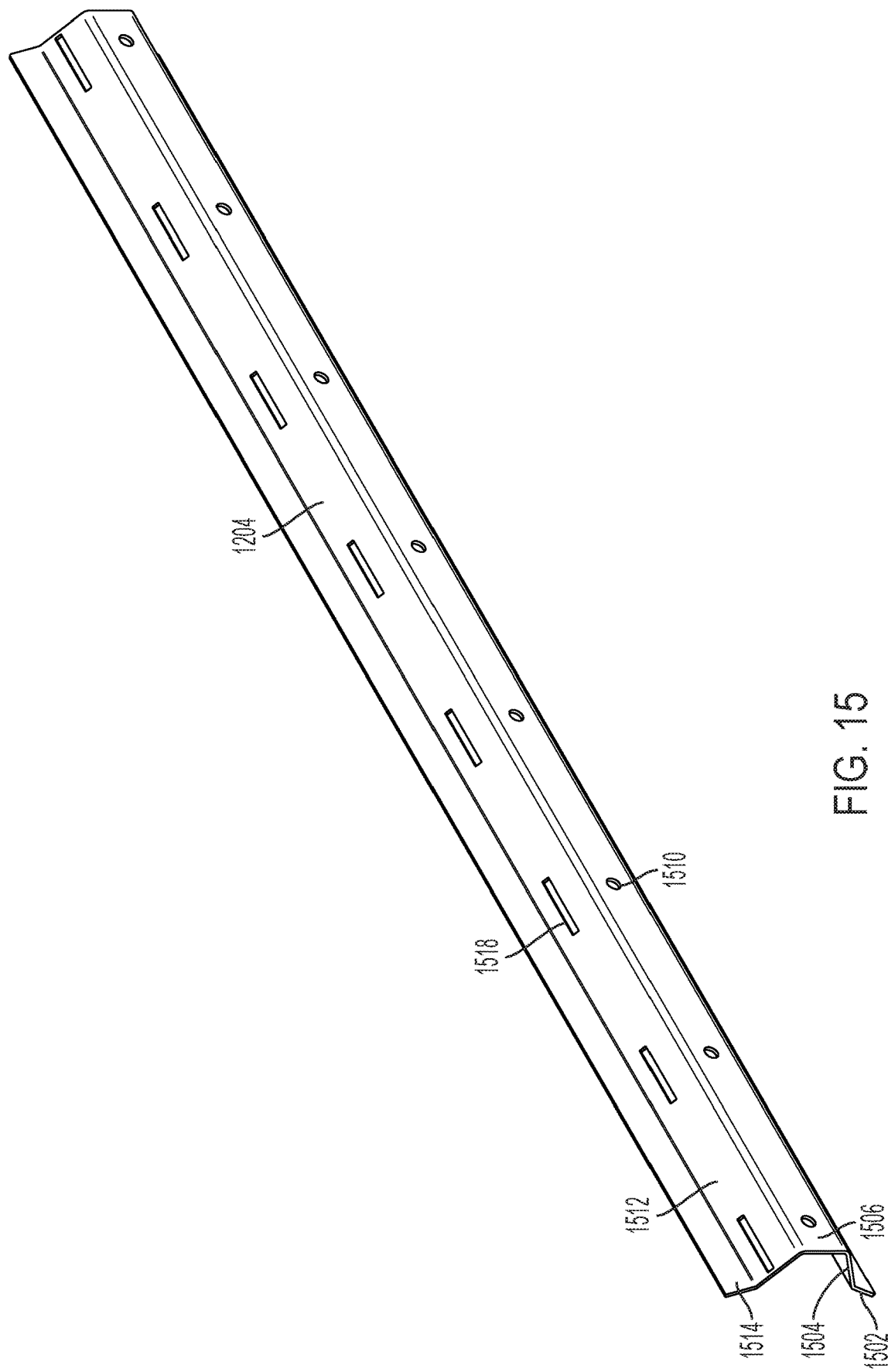
FIG. 15 depicts an isometric view of the support bracket of FIG. 12.

FIG. 15 depicts an isometric view of the support bracket 1204 of FIG. 12. The support bracket 1204 includes a first elongated planar surface 1502 that is configured to be welded (or otherwise mounted) to the outer surface of the cylinder 1201. An elongated surface 1504 extends upwardly from the surface 1502 at an obtuse angle. A planar elongated mounting surface 1506 extends transversely from and depends from the surface 1504. In an assembled form, the plate 1310 of the rasp bar 1202 is configured to be mounted to the surface 1506. A series of openings 1510 are disposed on the mounting surface 1506. Nuts 1602 (FIG. 16), such as weld nuts or cinch nuts, may be welded (or otherwise mounted) to the underside of the openings 1510 for receiving a fastener. Another elongated surface 1512 extends downwardly from the surface 1506 at an obtuse angle. A series of rectangular shaped elongated openings or channels 1518 are defined on the surface 1512. Each channel 1518 is sized to receive the bent section 1308 of the rasp bar 1202. An elongated surface 1514 extends from the surface 1512, and is configured to be welded (or otherwise mounted) to the outer surface of the cylinder 1201.

Figure 16:
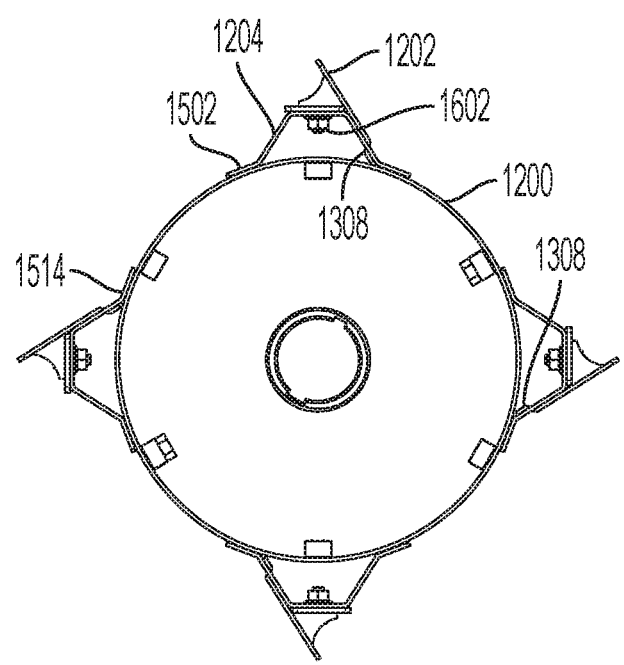
FIG. 16 is a side elevation view of the rotor of FIG. 12.

Referring now to the process of assembling the rasp bar 1202 onto the support bracket 1204, it is first assumed that the support brackets 1204 are already welded to the rotor cylinder 1201. The bent section 1308 of the rasp bar 1202 is inserted into the channel 1518, and the plate 1310 is positioned on the surface 1506 of the bracket 1204. At this time, the plate 1306 of the rasp bar 1202 is positioned against the surface 1512 of the bracket 1204, whereas the bent section 1308 is positioned against the opposite side of the surface 1512 of the bracket 1204. The fastener is then positioned through the openings 1510, and connected to the nut 1602 (FIG. 16). Once the fastener is installed, the rasp bar 1202 cannot be moved in any direction due to the fact that rasp bar 1202 is bolted to the bracket 1204, and the bent section 1308 of the rasp bar 1202 is constrained within the channel 1518. Cooperation between the bent section 1308 of the rasp bar 1202 and the channel 1518 guides installation of the rasp bar 1202 onto the bracket 1204 and also aids in retention (e.g., prevents rotation) of the rasp bar 1202 on the bracket 1204.

In light of all the foregoing, it should thus be apparent to those skilled in the art that there has been shown and described threshing components for a combine harvester. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A threshing system for a combine harvester, said threshing system comprising:
   a support bracket that is configured to be attached to a threshing rotor cylinder of the threshing system;

a rasp bar mounted to the support bracket, said rasp bar comprising (i) a first plate that is positioned against a first surface of the support bracket and (ii) a second plate that directly depends from the first plate and is positioned against a second surface of the support bracket, wherein the first plate intersects the second plate at an intersection point that is disposed at a central region of the second plate such that the second plate extends both above and below the intersection point; and a channel formed in one of the rasp bar and the support bracket for receiving a surface of the other of the rasp bar and the support bracket, wherein engagement between the channel and the surface limits movement of the rasp bar on the support bracket.

2. The threshing system of claim 1, further comprising the threshing rotor cylinder.

3. A combine harvester comprising the threshing system of claim 2.

4. The threshing system of claim 2, wherein the support bracket is permanently mounted to the threshing rotor cylinder.

5. The threshing system of claim 1, wherein the channel is formed on a leg portion of the second plate of the rasp bar, and the channel is configured to receive a side surface of the support bracket.

6. The threshing system of claim 5, wherein the first plate is disposed between an arm portion extending from the second plate of the rasp bar and the leg portion of the rasp bar, and wherein the intersection point is located between the arm portion and the leg portion.

7. The threshing system of claim 6, further comprising a fastener for mounting the first plate to the support bracket, and thereby captivating the rasp bar to the support bracket.

8. The threshing system of claim 6, further comprising two of the arm portions positioned on opposite sides of the rasp bar, and two of the leg portions positioned on the opposite sides of the rasp bar, each leg portion being configured to receive one of the side surfaces of the support bracket.

9. The threshing system of claim 6, wherein the arm portion and the leg portion extend from a same side of the second plate of the rasp bar.

10. The threshing system of claim 5, further comprising a recessed portion disposed on the support bracket through which the leg portion can pass to reach the side surface of the support bracket.

11. The threshing system of claim 5, further comprising a fastener for mounting the rasp bar to the first surface of the support bracket, wherein the side surface and the first surface represent different surfaces of the support bracket.

12. The threshing system of claim 1, wherein the support bracket is a unitized and elongated member that is configured to accommodate a plurality of rasp bars.

13. The threshing system of claim 12, wherein the channel is formed at least partially on a surface of the support bracket that is also positionable against a surface of the threshing rotor cylinder, and a lower end of the rasp bar is positionable within the channel.

14. The threshing system of claim 13, wherein the channel is formed in a bent over portion of the support bracket.

15. The threshing system of claim 12, wherein the channel is defined by an elongated opening formed in the support bracket, and a lower edge of the second date of the rasp bar is positionable within the elongated opening.

16. The threshing system of claim 13, wherein the lower edge of the second plate of the rasp bar comprises a bent section.

17. The threshing system of claim 16, wherein the lower edge is positioned against two different sides of the support bracket.

18. The threshing system of claim 1, wherein the first and second plates are separated by an internal angle (H) of between 100 and 160 degrees.

19. The threshing system of claim 1, wherein when the support bracket and the rasp bar are connected to the threshing rotor cylinder, the second plate extends further away from an axis of rotation of the threshing rotor cylinder than the first plate extends from the axis of rotation.

20. The threshing system of claim 1, further comprising a fastener positioned through an opening of the first plate for mounting the rasp bar to the support bracket.

* * * * *